United States Patent
van Rensburg et al.

(10) Patent No.: US 7,787,435 B2
(45) Date of Patent: Aug. 31, 2010

(54) METHOD AND SYSTEM FOR POLLING MOBILE STATIONS IN A WIRELESS NETWORK

(75) Inventors: Cornelius van Rensburg, Dallas, TX (US); Baowei Ji, Richardson, TX (US); Jiann-An Tsai, Richardson Collin County, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 898 days.

(21) Appl. No.: 11/232,605

(22) Filed: Sep. 22, 2005

(65) Prior Publication Data

US 2007/0064667 A1    Mar. 22, 2007

Related U.S. Application Data

(60) Provisional application No. 60/643,706, filed on Jan. 13, 2005.

(51) Int. Cl.
*H04J 3/16* (2006.01)

(52) U.S. Cl. .................. 370/346; 370/468; 370/430; 455/450; 455/452.2; 455/509

(58) Field of Classification Search ................ 370/346, 370/430, 449–457, 328, 329; 455/452.1–452.2, 455/509, 434
See application file for complete search history.

(56) References Cited

U.S. PATENT DOCUMENTS

| | | | | |
|---|---|---|---|---|
| 4,466,001 A | * | 8/1984 | Moore et al. | 340/825.52 |
| 4,979,165 A | * | 12/1990 | Dighe et al. | 370/416 |
| 4,989,204 A | * | 1/1991 | Shimizu et al. | 370/328 |
| 5,130,983 A | * | 7/1992 | Heffner, III | 370/449 |
| 5,371,739 A | * | 12/1994 | Knapczyk | 370/449 |
| 5,436,905 A | * | 7/1995 | Li et al. | 370/346 |
| 6,654,957 B1 | * | 11/2003 | Moore et al. | 725/111 |
| 7,072,315 B1 | * | 7/2006 | Liu et al. | 370/329 |
| 7,206,840 B2 | * | 4/2007 | Choi et al. | 709/225 |
| 7,430,212 B2 | * | 9/2008 | Stanley et al. | 370/420 |
| 7,460,509 B2 | * | 12/2008 | Klein et al. | 370/338 |
| 7,606,575 B2 | * | 10/2009 | Mahany et al. | 455/452.2 |
| 2005/0135284 A1 | * | 6/2005 | Nanda et al. | 370/294 |
| 2005/0249127 A1 | * | 11/2005 | Huo et al. | 370/252 |
| 2005/0272423 A1 | * | 12/2005 | Stephens et al. | 455/434 |
| 2007/0224978 A1 | * | 9/2007 | Wherry et al. | 455/414.2 |
| 2009/0185548 A1 | * | 7/2009 | Pratapagiri | 370/346 |

* cited by examiner

*Primary Examiner*—Sharad Rampuria

(57) ABSTRACT

A method of wireless communication is provided. The method comprises adaptively polling a plurality of subscriber stations to provide channel quality indications for a plurality of channels associated with at least a portion of an orthogonal frequency division multiple access wireless network and adjusting the at least a portion of the orthogonal frequency division multiple access wireless network based on the channel quality indications.

19 Claims, 4 Drawing Sheets

METHOD AND SYSTEM FOR POLLING MOBILE STATIONS IN A WIRELESS NETWORK

CROSS REFERENCE TO RELATED APPLICATION

This application claims priority under 35 U.S.C. 119(e) to United States Provisional Application No. 60/643,706, filed on Jan. 13, 2005, and which is incorporated herein by reference

TECHNICAL FIELD OF THE INVENTION

The present invention relates generally to wireless communications and, more specifically, to a method and system for polling mobile stations in a wireless network.

BACKGROUND OF THE INVENTION

In the CDMA2000 family of standards, which is designed for high mobility, each mobile terminal user (MT) is assigned a dedicated Channel Quality Information (CQI) channel to continuously report channel quality to a corresponding base station (BS). However, in the IEEE 802.16e standard, each MT reports CQI only when polled by the BS. This is because systems using the IEEE 802.16e standard are typically designed for only moderate mobility, and a sizeable number of MTs in these systems are stationary. Thus, a trade off exists between wasting reverse-link overhead (as a result of using too many CQI channels) in a continuous CQI reporting model and inefficient usage of forward link sub-channels by not assigning all possible sub-channels (as a result of using too few CQI channels) in a polling CQI reporting model.

Therefore, there is a need in the art for an improved wireless network that is capable of providing optimized polling of mobile stations. In particular, there is a need for optimized methods of polling mobile stations in wireless networks for sufficient channel quality information without wasting bandwidth.

SUMMARY OF THE INVENTION

A method of wireless communication is provided. The method comprises adaptively polling a plurality of mobile stations to provide channel quality indications for a plurality of channels associated with at least a portion of an orthogonal frequency division multiple access wireless network and adjusting the at least a portion of the orthogonal frequency division multiple access wireless network based on the channel quality indications. In an embodiment, the portion of an orthogonal frequency division multiple access wireless network of the method is the coverage area of a base station of the orthogonal frequency division multiple access network. In an embodiment, the adjusting of the method includes actions selected from the group consisting of adjusting a channel transmission power level of one of the channels, adjusting a channel data transmission rate of one of the channels, and preferentially allocating one of the channels of the at least a portion of the orthogonal frequency division multiple access wireless network for communication.

According to one embodiment of the present disclosure, a method for polling mobile stations in a wireless network is provided. According to an advantageous embodiment of the present disclosure, the method includes polling each of the mobile stations for Channel Quality Information (CQI) at a specified rate for a specified amount of time to generate initial polling results. A value for an initial minimum number of mobile stations to poll for CQI is selected for an initial polling cycle based on the initial polling results. At least the initial minimum number of mobile stations is polled for CQI during the initial polling cycle to generate subsequent polling results.

According to one embodiment of the present disclosure, the method also includes determining a CQI update ratio for each of the mobile stations and identifying the mobile stations to poll for CQI during the initial polling cycle based on the CQI update ratios for each of the mobile stations.

According to another embodiment of the present disclosure, the mobile stations to poll for CQI are identified based on the CQI update ratios for each of the mobile stations by identifying the initial minimum number of mobile stations having larger CQI update ratios than remaining mobile stations.

According to still another embodiment of the present disclosure, the mobile stations to poll for CQI are identified by identifying the mobile stations separately for each of a plurality of polling sessions, and the initial polling cycle includes the plurality of polling sessions.

According to yet another embodiment of the present disclosure, the method also includes selecting a value for a subsequent minimum number of mobile stations to poll for CQI for a subsequent polling cycle based on the subsequent polling results and polling at least the subsequent minimum number of mobile stations for CQI during the subsequent polling cycle.

According to even another embodiment of the present disclosure, at least the initial minimum number of mobile stations is polled for CQI during the initial polling cycle by polling at least the initial minimum number of mobile stations for CQI during a plurality of polling sessions. The method also includes identifying the mobile stations to be polled separately for each polling session.

According to a further embodiment of the present disclosure, the initial polling results and the subsequent polling results include, for each mobile station, CQI for a subset of sub-channels that are operable to provide communication between the base station and the mobile stations. The mobile station is operable to select the subset of sub-channels by determining a predefined number of sub-channels having a better channel quality than remaining sub-channels.

According to a still further embodiment of the present disclosure, the method also includes selecting a desired probability of a particular sub-channel being reported by an original minimum number of mobile stations. A probability of the particular sub-channel being unreported by each of the mobile stations is calculated. The original minimum number is calculated based on the selected, desired probability and based on the calculated probability. The value for the initial minimum number of mobile stations to poll for CQI for the initial polling cycle is selected based on the original minimum number, in addition to the initial polling results.

According to yet a further embodiment of the present disclosure, the predefined number is five and a total number of sub-channels is sixteen.

According to even a further embodiment of the present disclosure, the specified rate is a maximum allowable rate.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the several embodiments of the present disclosure in this patent document are by way of illustration only and should not be construed in any way to limit the scope of the disclosure. Those skilled in the art will understand that an embodiment of the present disclosure may be implemented in any suitably arranged wireless network.

Figure 1:
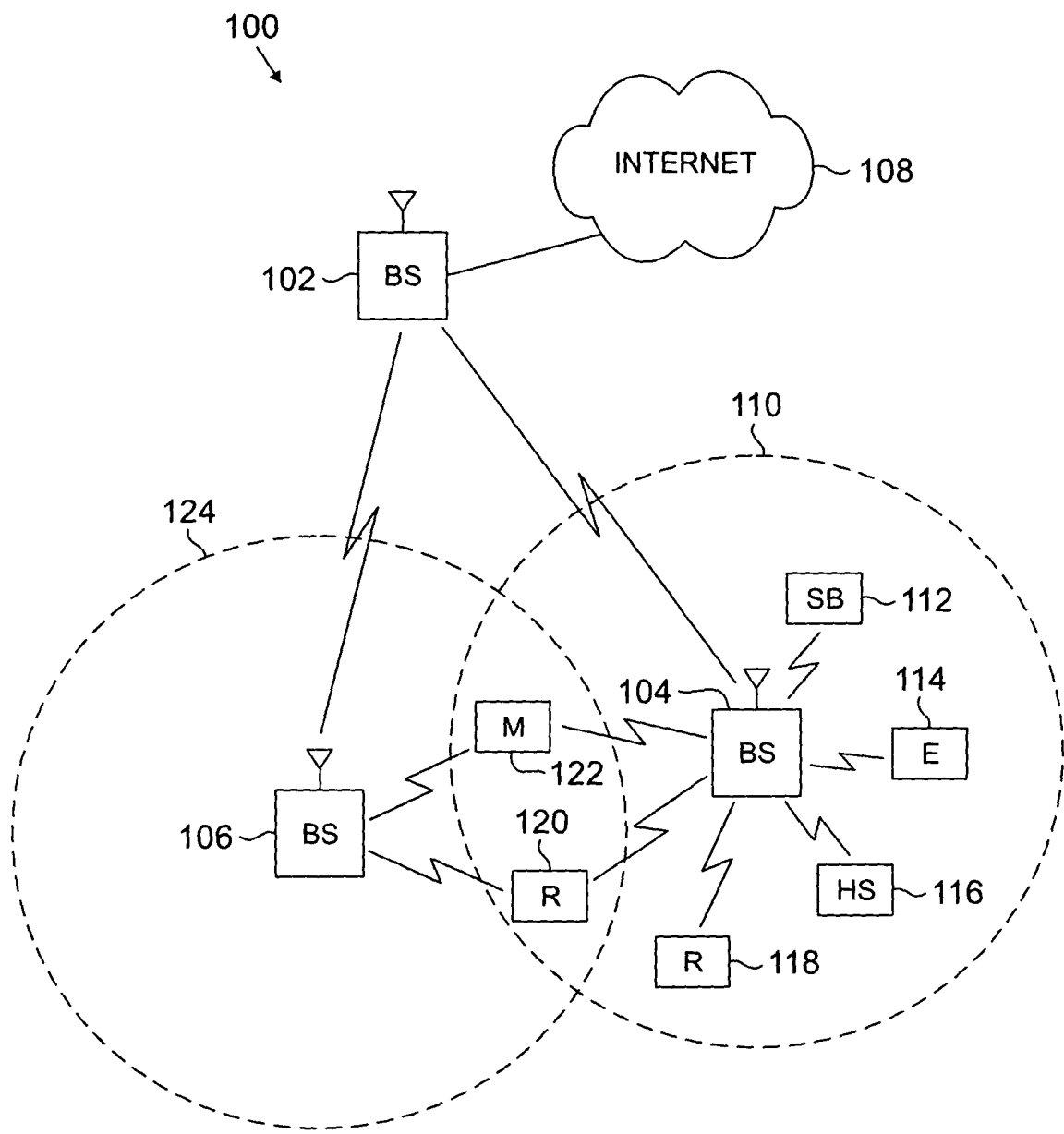
FIG. 1 illustrates an exemplary wireless network that is capable of providing polling of mobile stations according to an embodiment of the present disclosure.

FIG. 1 illustrates an exemplary wireless network 100 that is suitable for providing polling of subscriber stations (SSs) according to the several embodiments of the present disclosure. In an embodiment, the wireless network 100 includes a first base station 102 that is in communication with a second base station 104 and a third base station 106. The first base station 102 is in communication with an Internet 108. The second base station 104 provides wireless broadband access to the Internet 108, via the first base station 102, to a plurality of subscriber stations (SSs) within a coverage area 110 of the second base station 104 including a first SS 112 in a small business, a second SS 114 in an enterprise, a third SS 116 in a WiFi hotspot, a fourth SS 118 in a first residence, a fifth SS 120 in a second residence, and a sixth SS 122 in a mobile device. The third base station 106 provides wireless broadband access to the Internet 108, via the first base station 102, to a plurality of SSs within a coverage area 124 of the third base station 106 including the fifth SS 120 and the sixth SS 122. In other embodiments, the first base station 102 may be in communication with either fewer or more base stations. Additionally, while only six SSs have been depicted in FIG. 1 to avoid cluttering the drawing, it is understood that in an embodiment the wireless network 100 may be expected to provide wireless broadband access to many more than six SSs.

Note that the fifth SS 120 and the sixth SS 122, associated with the second residence and the mobile device respectively, are on the edge of the two coverage areas 110 and 124. The fifth SS 120 and the sixth SS 122 each communicate with both the second base station 104 and the third base station 106 and may be said to be operating in soft handoff. The concept of wireless handoff was developed to describe the need in cellular mobile phone networks to maintain voice calls as a cell phone passes into and out of possibly several different cell areas. In a hard handoff, a first communication link with the cell phone supported by a first cell would be taken down before a second communication link with the cell phone supported by a second cell would be established. In a soft handoff, the first communication link with the cell phone supported by the first cell would remain until after the second communication link with the cell phone supported by the second cell would be established, such that for a transient time both the first and second communication link were active concurrently and the cell phone was in communication concurrently with both the first and the second cell. The sixth SS 122, associated with the mobile device, may be in soft handoff for a transient period of time as the sixth SS 122 transits the overlap of the two coverage areas 110 and 124, for example, as a vehicle housing a wireless-enabled laptop computer drives along a road. The fifth SS 120, associated with the second residence, however, may remain in soft handoff for an indefinitely long period of time, for example, from ten minutes to a plurality of weeks.

In an embodiment, the base stations 102, 104, and 106 may communicate with each other and with the SSs 112, 114, 116, 118, 120, 122 using an IEEE 802.16, an IEEE 802.11, or an IEEE 802.20 wireless metropolitan area network standard, for example, an IEEE 802.16e standard. In another embodiment, however, a different wireless protocol may be employed, for example, a HIPERMAN wireless metropolitan area network standard. The first base station 102 may communicate through direct line-of-sight with the second base station 104 and the third base station 106. The second base station 104 and the third base station 106 may each communicate through non-line-of-sight with the SSs 112, 114, 116, 118, 120, and 122 using orthogonal frequency division multiplex techniques.

The second base station 104 may provide a T1 level service to the second SS 114 associated with the enterprise and a fractional T1 level service to the first SS 112 associated with the small business. The second base station 104 may provide wireless backhaul for the third SS 116 associated with the WiFi hotspot, which may be located in an airport, café, hotel, or college campus. The second base station 104 may provide digital subscriber line (DSL) level service to the fourth, fifth, and sixth SSs 118, 120, and 122. The SSs 112-122 may use the broadband access to the Internet 108 to access voice, data, video, video teleconferencing, and/or other broadband services. In an embodiment, one or more of the SSs 112-122 may be associated with an access point (AP) of a WiFi WLAN. The sixth SS 122 may include any of a number of mobile devices including a wireless-enabled laptop computer, personal data assistant, notebook, handheld device, or other wireless-enabled device. The fourth and fifth SSs 118 and 120 may include a wireless-enabled personal computer, laptop computer, gateway, or other device.

Dotted lines show the approximate extents of the coverage areas 110 and 124, which are shown as approximately circular for the purposes of illustration and explanation only. It should be clearly understood that the coverage areas associated with base stations, for example, the coverage areas 110 and 124 associated with the second base station 104 and the third base station 106, may have other shapes, including an irregular shape, depending upon the configuration of the base stations and the radio environment that may depend upon natural and man-made obstructions. Additionally, the coverage areas associated with base stations are not constant over time and may be imagined to "breathe"—expanding or contracting or changing shape—based on changing transmission power levels of the base station and/or the SSs, weather conditions, and other factors. In an embodiment, the radius of the coverage areas of the base stations, for example, the coverage areas 110 and 124 of the base stations 104 and 106, may extend in the range from about 2 kilometers to about fifty kilometers from the base stations.

As is well known in the art, a base station, such as base station 102, 104, and 106, may employ directional antennas to support a plurality of sectors within the coverage area. While in FIG. 1 the base stations 104 and 106 are depicted approximately in the center of their associated coverage areas 110 and 124, in other embodiments use of directional antennas may locate the base station near the edge of the coverage area, for example, at the point of a cone-shaped or pear-shaped coverage area.

The connection to the Internet 108 from the base station 102 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to the Internet 108 may be provided by different network nodes and equipment.

According to an embodiment of the present disclosure, base stations 104 and 106 of wireless network 100 are each operable to select a minimum number of SSs 112-122 to poll for Channel Quality Information (CQI) regarding the sub-channels used for communicating with base stations 104 and 106. Each base station 104, 106 is also operable to identify which of the SSs 112-122 to poll at a particular time in order to receive useful CQI. Based on the CQI received from the polled SSs 112-122, each base station 104 and 106 is also operable to assign sub-channels to each SS 112-122 in its coverage area for communication.

Figure 2:
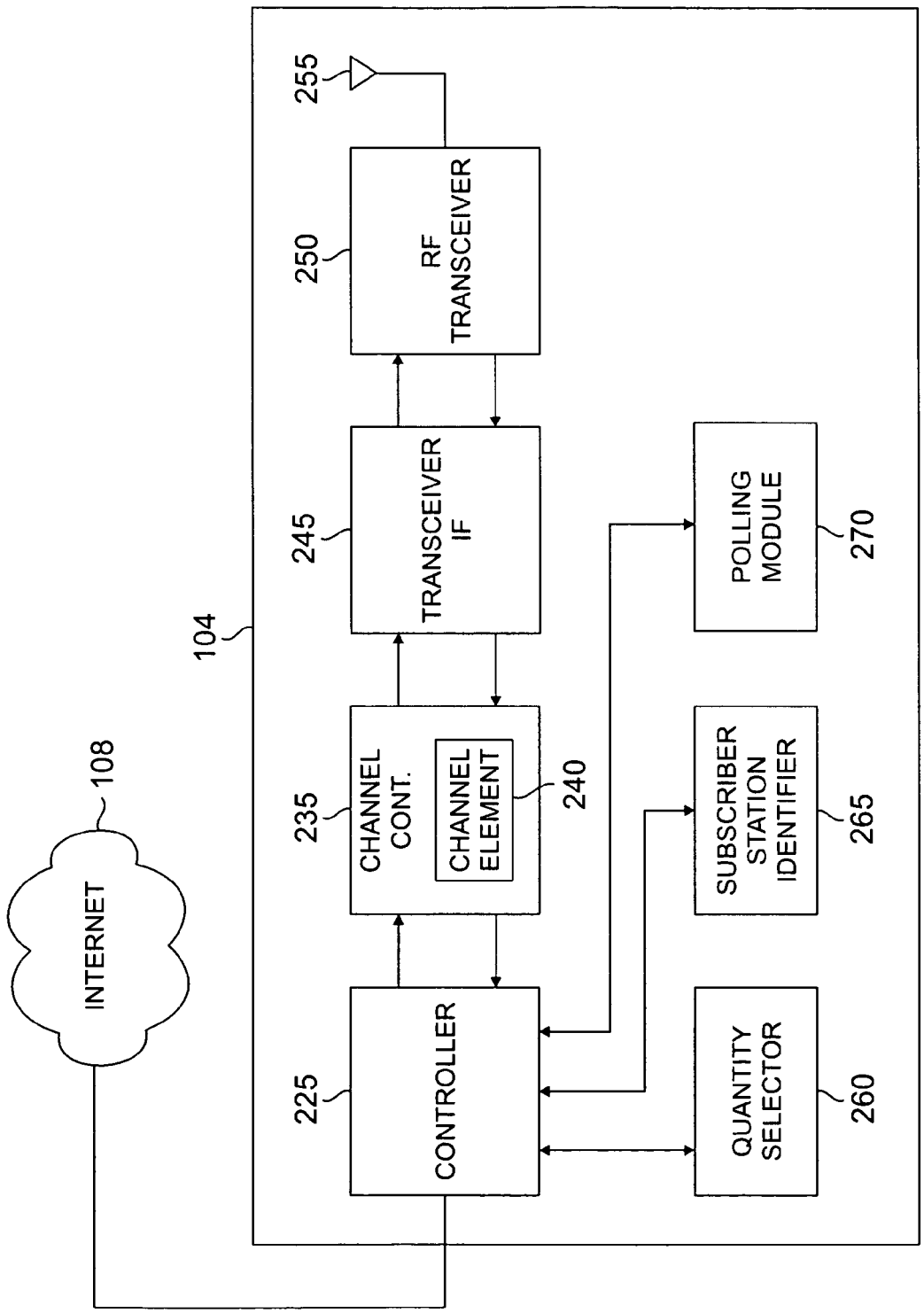
FIG. 2 illustrates an exemplary base station that is capable of selecting mobile stations for polling according to an embodiment of the present disclosure.

FIG. 2 illustrates base station 104 in greater detail according to an embodiment of the present disclosure. Base station 104 is illustrated by way of example only. However, it will be understood that the components illustrated and described with respect to base station 104 are also part of base stations 106 and 102. According to one embodiment, base station 104 comprises controller 225, channel controller 235 (which may comprise at least one channel element 240), transceiver interface (IF) 245, radiofrequency (RF) transceiver unit 250, antenna array 255, quantity selector 260, subscriber station identifier 265, and polling module 270.

Controller 225 may comprise processing circuitry and memory capable of executing an operating program that controls the overall operation of base station 104. In an embodiment, the controller 225 may be operable to communicate with the Internet 108. Under normal conditions, controller 225 directs the operation of channel controller 235, which may comprise a number of channel elements, such as channel element 240, that are each operable to perform bidirectional communication in the forward channel and the reverse channel. A "forward channel" refers to outbound signals from the base station 104 to SSs 112-122 and a "reverse channel" refers to inbound signals from SSs 112-122 to base station 104. Transceiver IF 245 transfers bidirectional channel signals between channel controller 240 and RF transceiver unit 250.

Antenna array 255 transmits forward channel signals received from RF transceiver unit 250 to subscriber stations 112-122 in the coverage area of base station 104. Antenna array 255 is also operable to send to RF transceiver unit 250 reverse channel signals received from subscriber stations 112-122 in the coverage area of the base station 104. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

Although illustrated separately, it will be understood that any two or all three of quantity selector 260, subscriber station identifier 265 and/or polling module 270 may be implemented together in a single application without departing from the scope of the present disclosure. Quantity selector 260 is operable to select a value for a minimum number of SSs 112-122 to poll for CQI, and subscriber station identifier 265 is operable to identify which of the SSs 112-122 in its coverage area to poll in order to receive useful CQI. Polling module 270 is operable to poll the SSs 112-122 identified by subscriber station identifier 265 for CQI. Based on the CQI received from the polled SSs 112-122, each base station 104 is operable to assign sub-channels to each SS 112-122 in its coverage area for communication.

In operation, quantity selector 260 selects a minimum number, x, of SSs 112-122 to poll during a current polling cycle, after which quantity selector 260 selects another minimum number of SSs 112-122 to poll during a subsequent polling cycle, and so on.

During each polling cycle, subscriber station identifier 265 identifies a set of x specific SSs 112-122 to poll for a current polling session. After the identified SSs 112-122 are polled by polling module 270, subscriber station identifier 265 then separately identifies another set of x specific SSs 112-122 to poll for a subsequent polling session based on the results of previously completed polls.

After the current polling cycle is completed, subscriber station identifier 265 identifies a set of x specific SSs 112-122 to poll in the next polling session based on the new x selected by quantity selector 260 for use in the subsequent polling cycle. Thus, subscriber station identifier 265 identifies SSs 112-122 to poll a number of times during each polling cycle (once for each polling session), while quantity selector 260 selects the minimum number, x, of SSs 112-122 to be polled once for each polling cycle.

For one embodiment, quantity selector 260 selects an original minimum number, x, of SSs 112-122 to be polled as follows:

Given a desired probability p=Probability (of reporting sub-channel n by x subscriber stations), it follows that $p_1$=Probability (of not reporting sub-channel n by one mobile station)

$$\frac{\binom{N-1}{M}}{\binom{N}{M}} = \frac{N-M}{N}, \quad \text{(eqn. 1)}$$

where N is the total number of sub-channels, M is the number of sub-channels reported by a particular subscriber station, and $$\binom{n}{i} = \frac{n!}{i!(n-i)!}.$$

For example, for a particular embodiment, N may be sixteen and M may be five. Then, finally, $$p = 1 - p_1^x \quad \text{and} \quad \text{(eqn. 2)}$$

$$x = \left\lfloor \frac{\log(1-p)}{\log(p_1)} \right\rfloor, \quad \text{(eqn. 3)}$$

where $\lfloor y \rfloor$ represents a rounding down operation to the integer closest to y.

Thus, using equation 3 and any suitable original value for p, quantity selector 260 may select an original value for the minimum number, x. Polling module 270 then polls each SS 112-122 in base station's 104 coverage area at a specified rate. For one embodiment, polling module 270 polls each SS 112-122 at the maximum allowable rate. The SSs 112-122 respond by providing CQI for a predefined number, M, of sub-channels. Each SS 112-122 provides CQI for the M sub-channels with the best channel quality for that SS 112-122.

Based on the polling results, quantity selector 260 generates a histogram that indicates the number of SSs 112-122 that reported CQI for any given sub-channel. If the least reported sub-channel has been reported less than a first threshold number of times and the change in the histogram over time is greater than a second threshold, quantity selector 260 selects a higher value for x for the subsequent polling cycle. However, if these conditions are not satisfied, quantity selector 260 selects a lower value for x for the subsequent polling cycle. The change in the value of x may be a specified amount or may be varied by quantity selector 260 based on previous changes in the value of x, the number of times the least-reported sub-channel was reported, the rate of change in the histogram and/or any other suitable criteria. Therefore, it can be seen that the quantity selector 260 dynamically adapts the number x based on changing channel conditions in the wireless network 100.

In an embodiment, the subscriber station identifier 265 identifies the x SSs 112-122 to be polled in each polling session by measuring the rate of change of the CQI observed by each of the SSs 112-122 and determining a CQI update ratio for each of the SSs 112-122 based on the measured rate of change. In an embodiment, the x SSs 112-122 with the highest CQI update ratios are identified by subscriber station identifier 265 as the SSs 112-122 to be polled in the subsequent polling session. Thus, a stationary or slow-moving SS 112-122 will have a relatively small CQI update ratio, resulting in a low probability of identifying that SS 112-122 for polling, while a fast-moving SS 112-122 will have a relatively high CQI update ratio, resulting in a high probability of identifying that SS 112-122 for polling.

For a particular embodiment, quantity selector 260 selects an original value for the minimum number, x, by using equation 3 and any suitable original value for p, such as p=0.90. Polling module 270 then polls each SS 112-122 in base station's 104 coverage area at the specified rate for a specified amount of time in order to obtain sufficient initial polling results. The SSs 112-122 respond by providing CQI for a predefined number, M, of sub-channels. Each SS 112-122 provides CQI for the M sub-channels with the best channel quality for that SS 112-122.

Based on the polling results, quantity selector 260 generates a histogram, $h(t)=[h_1 \ldots h_N]$, that indicates the number, $h_n$, of SSs 112-122 that reported CQI for a specific sub-channel n. Quantity selector 260 then finds the sub-channel that was reported by the fewest SSs 112-122 and determines a report instance value, $K=\min([h_1 \ldots h_N])$, for that sub-channel. Quantity selector 260 then calculates the change in the histogram, $\delta h = \|h(t)-h(t-1)\|^2$, over the polling cycle.

If the least reported sub-channel has been reported less than a first threshold number of times and the change in the histogram over time is greater than a second threshold $\{K<\text{Threshold}_1 \text{ and } \delta h > \text{Threshold}_2\}$, quantity selector 260 selects a higher value for x for the subsequent polling cycle. However, if these conditions are not satisfied, quantity selector 260 selects a lower value for x for the subsequent polling cycle.

Subscriber station identifier 265 identifies the x specific SSs 112-122 to be polled in each polling session by measuring, for each SS 112-122, the rate of change of the CQI ($\delta_{CQ(k)}$ for the $k^{th}$ subscriber station) and determining a CQI update ratio based on the measured rate of change. The CQI update ratio for each SS 112-122 is determined as follows:

$$\delta_{CQ} = \|[CQ_1(t) \ldots CQ_N(t)] - [CQ_1(t-1) \ldots CQ_N(t-1)]\|^2 + \epsilon,$$

with $\epsilon \ll CQ_n(t)$, which prevents $\delta_{CQ}$ from becoming zero. If a subscriber station is polled, $$R_k(t) = \alpha R_k(t-1) + (1-\alpha)\delta_{CQ};$$

otherwise, $$R_k(t) = \alpha R_k(t-1),$$

where $1 > \alpha > 0$. In an embodiment, $\alpha$ is about 0.1, but one skilled in the art will readily be able to select another desirable value of $\alpha$ for another specific embodiment.

The CQI update ratio is provided by:

$$\frac{\delta_{CQ_k}}{R_k}, k = 1, 2, \ldots N_u,$$

where $N_u$ is the total number of subscriber stations.

Subscriber station identifier 265 then identifies for polling the x SSs 112-122 with the largest CQI update ratios. Polling module 270 then polls the identified SSs 112-122 for the current polling session and the process repeats for another polling session until the polling cycle is completed, at which point the process repeats for a new polling cycle. A polling cycle may be considered completed after a specified number of polling sessions has been completed, after a specified amount of time has elapsed, or based on any other suitable criteria.

Figure 3:
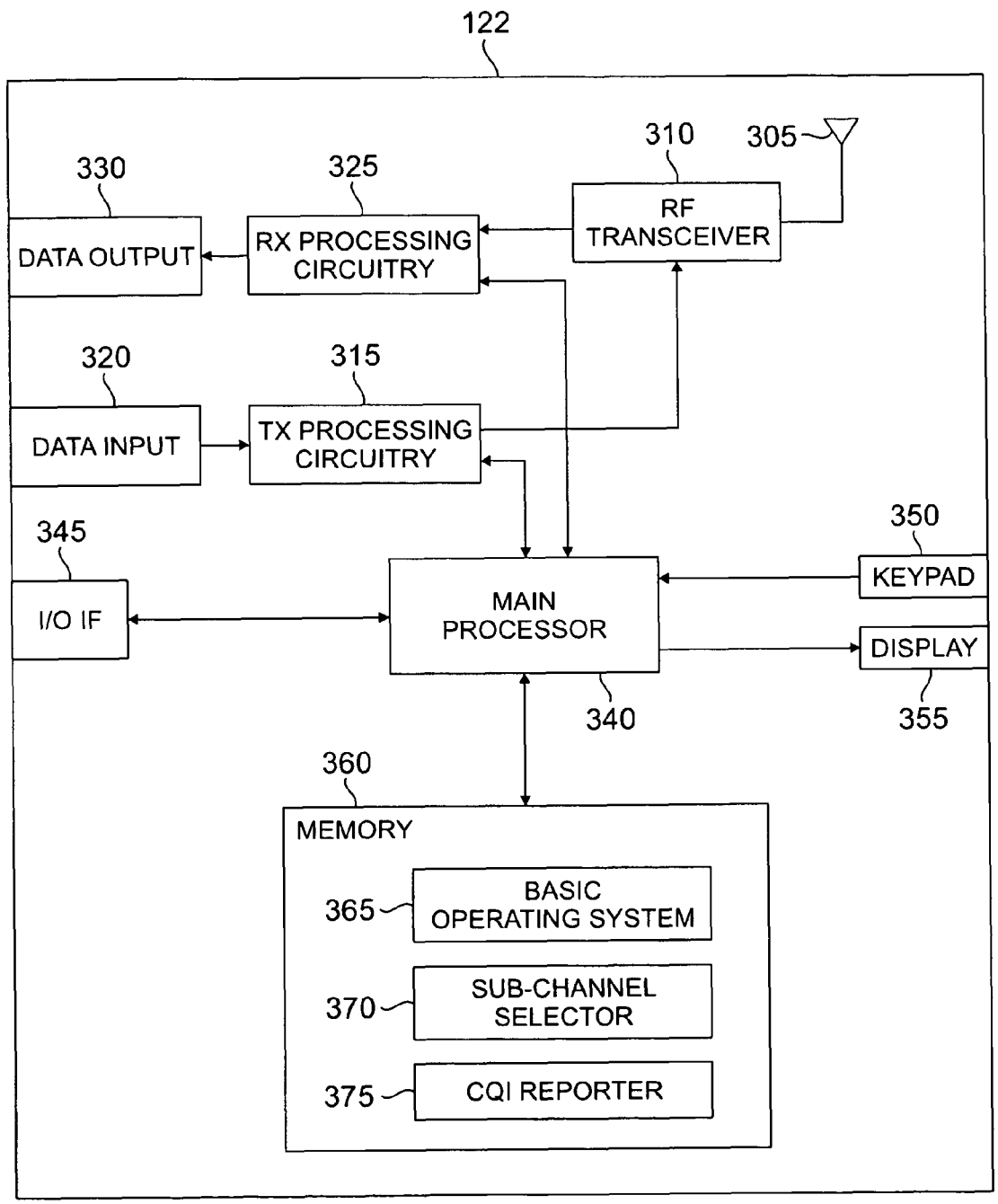
FIG. 3 illustrates an exemplary mobile station that is capable of responding to polls from the base station of FIG. 2 according to an embodiment of the present disclosure.

FIG. 3 illustrates subscriber station 122 in greater detail according to an embodiment of the present disclosure. SS 122 is illustrated by way of example only. However, it will be understood that the components illustrated and described with respect to SS 122 also may be part of SSs 112-120. SS 122 comprises antenna 305, radio frequency (RF) transceiver 310, transmit (TX) processing circuitry 315, data input 320, receive (RX) processing circuitry 325, and data output 330. SS 122 also comprises main processor 340, input/output (I/O) interface (IF) 345, keypad 350, display 355, and memory 360.

RF transceiver 310 receives from antenna 305 an incoming RF signal transmitted by BS 104. RF transceiver 310 down-converts the incoming RF signal to produce an intermediate frequency (IF) or a baseband signal. The IF or baseband signal may be sent to receiver processing circuitry 325, which produces a processed baseband signal by filtering, decoding, and/or digitizing the baseband or IF signal. Receiver processing circuitry 325 is also operable to transmit the processed baseband signal to data output 330 (e.g., when the processed baseband signal comprises voice data) or to main processor 340 for further processing (e.g., when the processed baseband signal relates to web browsing).

Transmitter processing circuitry 315 receives analog or digital voice data from data input 320 or other outgoing baseband data (e.g., web data, e-mail, interactive video game data and the like) from main processor 340. Transmitter processing circuitry 315 encodes, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a read-only memory (ROM). Main processor 340 executes basic operating system program 365 stored in memory 360 in order to control the overall operation of SS 122. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs resident in memory 360. Main processor 340 may move data into or out of memory 360, as required by an executing process.

Memory 360 further comprises a sub-channel selector 370 and a CQI reporter 375. Although illustrated separately, it will be understood that sub-channel selector 370 and CQI reporter 375 may be implemented together in a single application without departing from the scope of the present disclosure.

When SS 122 is polled by base station 104, sub-channel selector 370 is operable to select the predefined number, M, of sub-channels on which to report CQI to base station 104 during the polling session. Thus, sub-channel selector 370 is operable to determine which of the sub-channels have the best channel quality and to select the M best sub-channels for reporting. CQI reporter 375 is operable to report to base station 104 the CQI for the M sub-channels selected by sub-channel selector 370.

Main processor 340 is also coupled to the I/O interface 345. I/O interface 345 provides SS 122 with the ability to connect to other devices, such as laptop computers, handheld computers and the like. I/O interface 345 provides a communication path between these accessories and main controller 340. Main processor 340 is also coupled to keypad 350 and display unit 355. The operator of SS 122 may use keypad 350 to enter data into SS 122. Display 355 may comprise a liquid crystal display capable of rendering text and/or graphics from websites. It will be understood that additional embodiments may use other types of displays.

Figure 4:
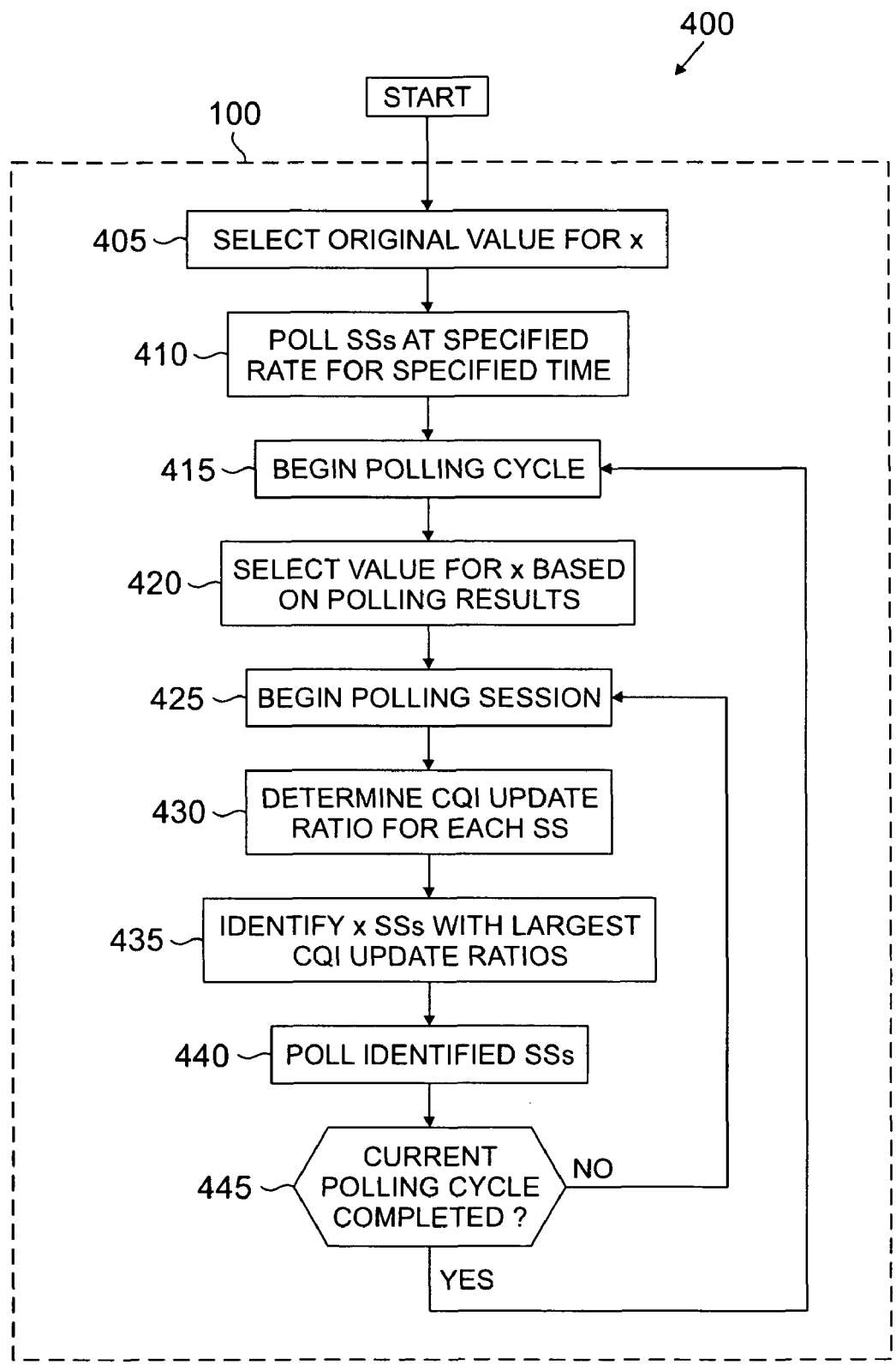
FIG. 4 is a flow diagram illustrating a method for polling mobile stations according to an embodiment of the present disclosure.

FIG. 4 is a flow diagram illustrating a method 400 for polling SSs 112-122 according to an embodiment of the present disclosure. For the purposes of simplicity and clarity in explaining the operation of the present disclosure, it shall be assumed in the following example that base station 104 of wireless network 100 is polling a plurality of SSs 112-122. However, the description that follows also applies to the remaining base stations in wireless network 100.

Initially, quantity selector 260 selects an original value for x, the minimum number of SSs 112-122 to be polled in a particular polling cycle (process step 405). For example, quantity selector 260 may select the original value based on equation 3, described above in connection with FIG. 2. Polling module 270 then polls each subscriber station (SS) 112-122 in the coverage area of base station 104 at a specified rate for a specified amount of time (process step 410). For a particular embodiment, polling module 270 polls the SSs 112-122 at a maximum allowable rate.

A polling cycle then begins (process step 415). Quantity selector 260 selects a value for x for the current polling cycle based on the polling results received from the SSs 112-122 (process step 420).

A polling session then begins (process step 425). Subscriber station identifier 265 determines a CQI update ratio for each SS 112-122 in the coverage area of base station 104 (process step 430). Next, subscriber station identifier 265 identifies the x SSs 112-122 with the largest CQI update ratios (process step 435), and polling module 270 polls the identified SSs 112-122 for CQI (process step 440).

If the current polling cycle has not been completed (process step 445), another polling session begins (process step 425). However, if the current polling cycle has been completed (process step 445), a subsequent polling cycle begins (process step 415). A polling cycle may be considered completed after a specified number of polling sessions has been completed, after a specified amount of time has elapsed, or based on any other suitable criteria.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of wireless communication, comprising:
adaptively polling a plurality of subscriber stations to provide channel quality indications for a plurality of channels associated with at least a portion of an orthogonal frequency division multiple access wireless network, wherein a subsequent polling session is performed based at least in part on channel quality information results from a previous polling session; and
adjusting the at least a portion of the orthogonal frequency division multiple access wireless network based on the channel quality indications,
wherein the polling adapts to poll a greater number of subscriber stations per a first time period when a channel quality indication is provided for a channel of the at least a portion of the orthogonal frequency division multiple access wireless network less than a threshold number of times per a second time period.

2. The method of claim 1, wherein the at least a portion of the orthogonal frequency division multiple access wireless network is the coverage area of a base station of the orthogonal frequency division multiple access wireless network.

3. The method of claim 1, wherein the adjusting includes actions selected from the group consisting of adjusting a channel transmission power level of one of the channels, adjusting a channel data transmission rate of one of the channels, and preferentially allocating one of the channels of the at least a portion of the orthogonal frequency division multiple access wireless network for communication.

4. The method of claim 1, wherein the orthogonal frequency division multiple access wireless network is selected from the group consisting of an IEEE 802.16 wireless network, an IEEE 802.11 wireless network, and an IEEE 802.20 wireless network.

5. The method of claim 1, wherein the polling adapts to poll a first subscriber station more frequently than a second subscriber station based on the channel quality indications provided by the first subscriber station changing more rapidly than the channel quality indications provided by the second subscriber station.

6. The method of claim 5, further including determining at least one channel quality indication rate of change for each subscriber station.

7. The method of Claim 1, further including counting the number of times, for each of the channels, a channel quality indication is provided for the channel during the second time period and wherein the first time period is less than the second time period.

8. For use in a wireless network, a base station operable to poll a plurality of subscriber stations in a coverage area of the base station, the base station comprising:
a polling module operable to adaptively poll each of the subscriber stations for Channel Quality Information (CQI) at a specified rate for a specified amount of time to generate initial polling results;
a quantity selector operable to select a value for an initial minimum number of subscriber stations to poll for CQI for an initial polling cycle based on the initial polling results,
wherein the quantity selector is configured to select a greater number of subscriber stations per a first time period when a channel quality indication is provided for a channel of the at least a portion of the orthogonal frequency division multiple access wireless network less than a threshold number of times per a second time period; and
the polling module further operable to poll at least the initial minimum number of subscriber stations for CQI during the initial polling cycle to generate subsequent polling results.

9. The base station as set forth in claim 8, wherein the polling module is further operable to poll at least the initial minimum number of subscriber stations for CQI during a plurality of polling sessions, and to identify separately the subscriber stations to be polled during each polling session.

10. The base station as set forth in claim 8, wherein the initial polling results and the subsequent polling results comprise, for each subscriber station, CQI for a subset of sub-channels operable to provide communication between the base station and the subscriber stations, the subscriber station operable to select the subset of sub-channels by determining a predefined number of sub-channels having a better channel quality than remaining sub-channels.

11. The base station as set forth in claim 8, further comprising a subscriber station identifier operable to determine a CQI update ratio for each of the subscriber stations and to identify the subscriber stations to poll for CQI during the initial polling cycle based on the CQI update ratios for each of the subscriber stations.

12. The base station as set forth in claim 11, the subscriber station identifier operable to identify the subscriber stations to poll for CQI based on the CQI update ratios for each of the subscriber stations by identifying the initial minimum number of subscriber stations having larger CQI update ratios than remaining subscriber stations.

13. The base station as set forth in claim 11, the subscriber station identifier further operable to identify the subscriber stations to poll for CQI by identifying the subscriber stations separately for each of a plurality of polling sessions, the initial polling cycle comprising the plurality of polling sessions.

14. The base station as set forth in claim 8, the quantity selector further operable to select a value for a subsequent minimum number of subscriber stations to poll for CQI for a subsequent polling cycle based on the subsequent polling results, and the polling module further operable to poll at least the subsequent minimum number of subscriber stations for CQI during the subsequent polling cycle.

15. The base station as set forth in claim 8, the initial polling results and the subsequent polling results comprising, for each subscriber station, CQI for a subset of sub-channels operable to provide communication between the base station and the subscriber stations, the subscriber station operable to select the subset of sub-channels by determining a predefined number of sub-channels having a better channel quality than remaining sub-channels.

16. The base station as set forth in claim 8, the specified rate comprising a maximum allowable rate.

17. For use in a wireless network, a subscriber station in a coverage area of a base station, the subscriber station operable to be adaptively polled by the base station, wherein a subsequent polling session is performed based at least in part on channel quality information results from a previous polling session, the subscriber station comprising:
a sub-channel selector operable to select, from a plurality of sub-channels operable to provide communication between the base station and the subscriber station, a predefined number of sub-channels on which to report Channel Quality Information (CQI) to the base station during a polling session, wherein the polling adapts to poll a greater number of subscriber stations per a first time period when a channel quality indication is provided for a channel of the at least a portion of the orthogonal frequency division multiple access wireless network less than a threshold number of times per a second time period; and
a CQI reporter operable to report to the base station the CQI for the selected sub-channels during the polling session.

18. The subscriber station as set forth in claim 17, the sub-channel selector operable to select the predefined number of sub-channels on which to report CQI by determining the predefined number of sub-channels having a better channel quality than remaining sub-channels.

19. The subscriber station as set forth in claim 17, the predefined number comprising five and a total number of sub-channels comprising sixteen.

* * * * *